US012627640B1

(12) United States Patent
Lee et al.

(10) Patent No.: US 12,627,640 B1
(45) Date of Patent: May 12, 2026

(54) SECURED CLOUD WORKLOAD DEPLOYMENT

(71) Applicant: INTERNATIONAL BUSINESS MACHINES CORPORATION, Armonk, NY (US)

(72) Inventors: Cheng-Ta Lee, Cumming, GA (US); David O'Connor, Killarney (IE); Mark Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 18/944,994

(22) Filed: Nov. 12, 2024

(51) Int. Cl.
| | |
|---|---|
| *H04L 9/40* | (2022.01) |
| *G06F 21/62* | (2013.01) |
| *H04L 9/08* | (2006.01) |

(52) U.S. Cl.
CPC ...... H04L 63/0428 (2013.01); G06F 21/6218 (2013.01); H04L 9/0869 (2013.01)

(58) Field of Classification Search
CPC ............... H04L 63/0428; H04L 9/0869; G06F 21/6218
USPC .......................................................... 713/153
See application file for complete search history.

(56) References Cited

U.S. PATENT DOCUMENTS

| | | | | |
|---|---|---|---|---|
| 10,097,571 | B2 * | 10/2018 | Bower, III | ............... H04L 41/28 |
| 10,212,190 | B2 | 2/2019 | Nagaratnam et al. | |
| 10,244,002 | B2 | 3/2019 | Hoy et al. | |
| 10,305,914 | B1 * | 5/2019 | Brin | ...................... H04L 9/3236 |
| 10,673,900 | B2 | 6/2020 | Nagaratnam et al. | |

| | | | | |
|---|---|---|---|---|
| 10,691,790 | B2 * | 6/2020 | Lounsberry | ........... H04L 9/3255 |
| 10,855,690 | B2 * | 12/2020 | Roth | .................... H04L 63/0853 |
| 11,610,002 | B2 * | 3/2023 | Varga | ...................... H04W 4/50 |
| 11,947,444 | B2 | 4/2024 | Copty et al. | |
| 2015/0106869 | A1 * | 4/2015 | Cabrera | ................ H04L 9/3226 |
| | | | | 726/1 |
| 2018/0375648 | A1 * | 12/2018 | Huang | .................. H04L 9/0662 |
| 2021/0084038 | A1 * | 3/2021 | Feasel | .................. G06F 21/629 |
| 2021/0136053 | A1 * | 5/2021 | Wang | ................... H04L 63/083 |
| 2022/0019455 | A1 * | 1/2022 | Cao | ...................... G06F 21/6218 |
| 2024/0012931 | A1 | 1/2024 | Yannuzzi et al. | |

(Continued)

FOREIGN PATENT DOCUMENTS

| | | | | |
|---|---|---|---|---|
| EP | 4435647 A1 * | 9/2024 | ............. | H04L 9/085 |

OTHER PUBLICATIONS

AWS. (Oct. 8, 2024). AWS Secrets Manager best practices. AWS Documentation 2019-2026. https://web.archive.org/web/20241008050253/https://docs.aws.amazon.com/secretsmanager/latest/userguide/best-practices.html (Year: 2024).*

(Continued)

*Primary Examiner* — Philip J Chea
*Assistant Examiner* — Dorianne Alvarado David
(74) *Attorney, Agent, or Firm* — Yee & Associates, P.C.

(57) ABSTRACT

Systems, methods, and computer program products for limiting unauthorized access to sensitive information in a cloud workload are described herein. A method comprises reading a provisioning request from a host server by a secret manager of a cloud workload; storing sensitive information from the provisioning request in memory accessible to a secret manager of the cloud workload; provisioning resources on the workload server for an application instance based on the provisioning request; receiving an information request; and transmitting the sensitive information to the application instance.

20 Claims, 5 Drawing Sheets

(56)        References Cited

U.S. PATENT DOCUMENTS

| | | | |
|---|---|---|---|
| 2024/0095338 A1* | 3/2024 | Levinson | G06F 9/455 |
| 2024/0305454 A1* | 9/2024 | Juneja | H04L 9/3263 |
| 2024/0388569 A1* | 11/2024 | Cosentino | H04L 63/107 |
| 2025/0124120 A1* | 4/2025 | Bohman | G06F 21/45 |
| 2025/0240293 A1* | 7/2025 | Ponnuru | H04L 63/08 |
| 2025/0310093 A1* | 10/2025 | Waisbard | H04L 9/0894 |

OTHER PUBLICATIONS

Blomqvist, M., Koivunen, L., and Makila, T. (2021). Secrets Management in a Multi-Cloud Kubernetes Environment. (Year: 2021).*
Emelander, S. and Patel, R. (2022). "Beyond database password management: 5 use cases for AWS Secrets Manager". AWS re: Invent, Las Vegas, NV. https://d1.awsstatic.com/events/Summits/reinvent2022/SEC325-R_Beyond-database-password-management-5-use-cases-for-AWS-Secrets-Manager.pdf (Year: 2022).*
Jurvanen, K. J. (2021). Using AWS Secrets Manager with Kubernetes. (Year: 2021).*
Kushwah, S. (2023). "Securing Kubernetes Secrets: Integrating AWS Secrets Manager with EKS". Medium. https://medium.com/ (Year: 2023).*
Leaver, M. and ChatGPT. (2023). "Secret Managers". 2BrightSparks. https://www.2brightsparks.com/resources/articles/secrets-managers. html (Year: 2023).*
Mode, R. (2021). "Case Study: Store and Retrieve secrets using AWS Secrets Manager". Medium. https://medium.com/ (Year: 2021).*
Pierce, T. and Krishnan Venugopal, N. (2021). "How to use AWS Secrets & Configuration Provider with your Kubernetes Secrets Store CSI driver". AWS Security Blog. https://aws.amazon.com/blogs/ (Year: 2021).*
Pum, M., & Lucky, G. (Oct. 16, 2024). Managing Secrets in Multi-Cloud and Containerized Systems. (Year: 2024).*
Radhakrishnan, S., Aggarwal, A., Miller, Z. (Oct. 5, 2023). "Use AWS Secrets Manager to store and manage secrets in on-premises or multicloud workloads". AWS Security Blog. https://aws.amazon.com/blogs/ (Year: 2023).*
Brasser et al., "Trusted Container Extensions for Container-based Confidential Computing," arXiv:2205.0574v1 [cs.CR], Mar. 11, 2022, 10 pages.
Findlay et al., "BPFContain: Fixing the soft underbelly of container security," arXiv:2102.06972vi [cs.CR] Feb. 13, 2021, 16 pages.
Gotzfried et al., "RamCrypt: Kernel-based Address Space Encryption for User-mode Processes," ACM Publishing'16, May 30-Jun. 3, 2016, 6 pages.
IBM Secure Execution Components, Linux on IBM Systems, Jan. 13, 2025, 4 pages.
Johnson et al., "Parma: Confidential Containers via Attested Execution Policies," arXiv:2302.03976v3 [cs.CR], Mar. 7, 2023, 14 pages.

* cited by examiner

Read a provision request comprising sensitive information — 102

Store the sensitive information in memory accessible to a secret manager — 104

Provision resources on the workload server for an application instance — 106

Read an information request — 108

Transmit the sensitive information to the application — 110

400

SECURED CLOUD WORKLOAD DEPLOYMENT

BACKGROUND

Embodiments of the present disclosure relate to limiting unauthorized access to sensitive information in a cloud workload.

SUMMARY

According to embodiments of the present disclosure, methods of, computer program products for, and computer systems for limiting unauthorized access to sensitive information in a cloud workload are disclosed. A method for limiting unauthorized access to sensitive information in a cloud workload may include reading a provisioning request of a host server. The provisioning request may be read by a secret manager of the cloud workload. The provisioning request may comprise sensitive information. The method may include storing the sensitive information in memory accessible to a secret manager of the cloud workload. The method may include provisioning resources on the workload server for an application instance. The provisioning may be based on the provisioning request. The method may include reading an information request. The information request may be received by the secret manager. The method may include transmitting the sensitive information to the application instance.

DETAILED DESCRIPTION

Sensitive information is commonly passed to cloud workloads during deployment. Sensitive information includes application programming interface (API) keys, credentials (e.g., a password), private keys, and/or other information a user desires to remain confidential. The sensitive information may be susceptible to being accessed by unauthorized users due to the passage of the information to the workloads. As such, methods for passing sensitive information and/or maintaining sensitive information within cloud workloads that limit this risk are desired. Current methods for preventing the sensitive information from being accessed by unauthorized users are susceptible to enabling the sensitive information to be leaked. For example, current methods present the sensitive information in a plain text (unencrypted) format in the cloud workloads. For example, running the "export" command inside a container may reveal sensitive information. Further, existing methods establish paths for the unauthorized users to follow to obtain the sensitive information. For example, one method that presents the sensitive information in an unencrypted format includes the use of a secret vault (e.g., HashiCorp vault and Kubernetes Secret) for restricting access to sensitive information. For example, one method includes storing the sensitive information in sidecars. This method does not require the unauthorized user to be authenticated, as it only requires the unauthorized users to have access to configuration files for the workload to retrieve the sensitive information.

Accordingly, methods for forcing the unauthorized users to take additional steps to access the sensitive information are desired. For example, such methods may force unauthorized users to perform a "ptrace" to access the sensitive information. The additional steps required are likely to be caught and stopped by security solutions (e.g., Endpoint Detection and Response). One such method (as described herein) creates a service running inside the workload to take incoming application provisioning requests and storing the sensitive information included in the requests in memory. In such a method, the sensitive information only exists in the memory and not in any other forms within the workload. This method is further enhanced by encrypting sensitive information, enforcing an authentication policy, and/or other layers of security as described herein.

Figure 1:
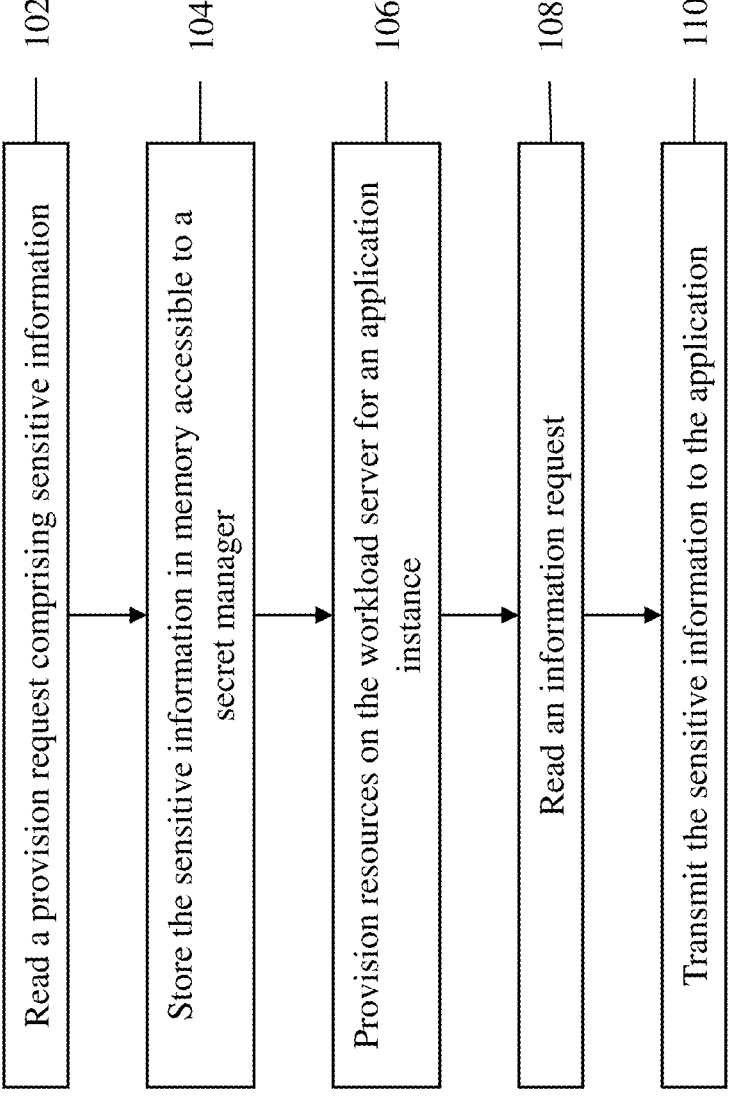
FIG. 1 is a flow diagram depicting an exemplary method for limiting unauthorized access to sensitive information in a cloud workload, in accordance with one or more embodiments of this disclosure.

FIG. 1 is a flowchart illustrating an exemplary method 100 for limiting unauthorized access to sensitive information in a cloud workload according to one or more exemplary embodiments of the present disclosure. The operations of method 100 presented below are intended to be illustrative. In some implementations, method 100 is accomplished with one or more additional operations not described and/or without one or more of the operations discussed. Additionally, the order in which the operations of method 100 are illustrated in FIG. 1 and described below is not intended to be limiting.

In some implementations, method 100 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of method 100.

Operation 102 comprises reading a provisioning request from a host server. The provisioning request may be read by a secret manager of a cloud workload. The provisioning request may be received at a workload server associated with the cloud workload. In some implementations, reading the provisioning request may comprise intercepting the provisioning request upon receipt. The cloud workload may comprise a container executed in a pod. The provisioning request may comprise an identification of sensitive information, an origin of the provisioning request, and/or other information. The sensitive information may comprise an application programming interface (API) key, a cryptographic signature, credentials, and/or other information a user may desire to keep confidential. By way of non-limiting example, the host server is a node. The node may be a virtual machine or a physical machine. By way of non-limiting example, the pod runs on the node. The pod may comprise the secret manager.

Operation 104 comprises storing the sensitive information in memory accessible to the secret manager of the cloud workload. In some implementations, method 100 includes encrypting the sensitive information prior to storing the sensitive information. Encrypting the sensitive information may comprise randomly generating a key. The sensitive information may only be stored within the cloud workload in the memory. As such, the sensitive information may only exist in the cloud workload within the memory.

Operation 106 comprises provisioning resources on the workload server for an application instance. The provisioning may be based on the provisioning request. In some implementations, method 100 includes determining whether the origin of the provisioning request is the host server. The determination may be based on the identification. By way of non-limiting example, storing the sensitive information and/or provisioning the resources is performed responsive to determining the origin of the provisioning request is the host server. By way of non-limiting example, the sensitive information is not stored and/or the resources are not provisioned responsive to determining the origin of the provisioning request is not the host server.

In some implementations, the identification comprises an internet protocol (IP) address. Determining whether the origin of the provisioning request is the network server may comprise determining whether a network address of the IP address is the same as a network address associated with the host server. In some implementations, the identification comprises a private key. In such implementations, determining whether the origin of the provisioning request is the host server comprises using a public key associated with the host server.

Operation 108 comprises reading an information request. The information request may be read by the secret manager. The information request may be transmitted by the host server. The information request may have been received by the workload server prior to being read by the secret manager. The information request may be a request for the sensitive information to be transmitted or provided to an application instance. In some implementations, information requests are periodically transmitted to the secret manager. By way of non-limiting example, the information requests are transmitted to the secret manager when the sensitive information is required for an application instance to perform a task. Operation 110 includes transmitting the sensitive information to the application instance. In some implementations, method 100 further comprises removing the sensitive information from the memory responsive to transmitting the sensitive information to the host server.

Figure 2:
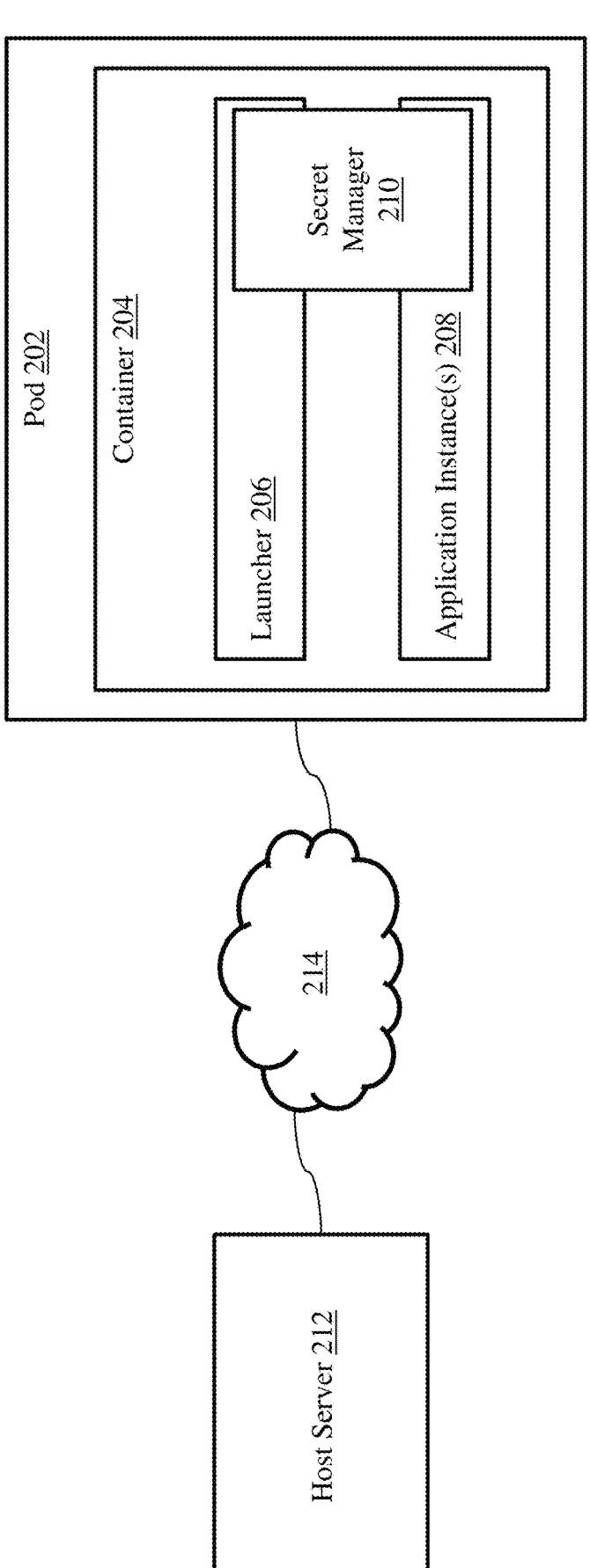
FIG. 2 is a block diagram depicting an exemplary system for limiting unauthorized access to sensitive information in a cloud workload, in accordance with one or more embodiments of this disclosure.

Referring now to FIG. 2, a block diagram of an exemplary system 200 for limiting unauthorized access to sensitive information in a cloud workload in accordance with one or more embodiments of this disclosure is shown. Pod 202 comprises a container 204 and/or one or more other containers. Container 204 may be an executable image comprising software and any dependencies of the software. Container 204 comprises a launcher 206, one or more application instances 208, and a secret manager 210. Launcher 206 may launch one or more application instances 208. Secret manager 210 may be the same as or similar to the secret manager described with respect to FIG. 1.

In some implementations, host server 212 is connected to pod 202 via a network 214. In some implementations, host server 212 is local to pod 202. A provisioning request from host server 212 comprising sensitive information may be received and/or read by pod 202. The provisioning request may be received and/or read by secret manager 210. Secret manager 210 may store the sensitive information in memory. The memory may be shared by one or more processes of container 204. Such storing of the sensitive information may ensure the sensitive information only exists in the workload within the memory. Secret manager 210 may provision resources for one or more application instances 208. Launcher 206 may launch one or more application instances 208 in accordance with the provisioning and storing. Launching one or more application instances 208 may comprise forking a process of container 204. Forking the process may split the process into a parent process and a child process. The memory may be shared by at least the parent process and the child process.

Figure 3:
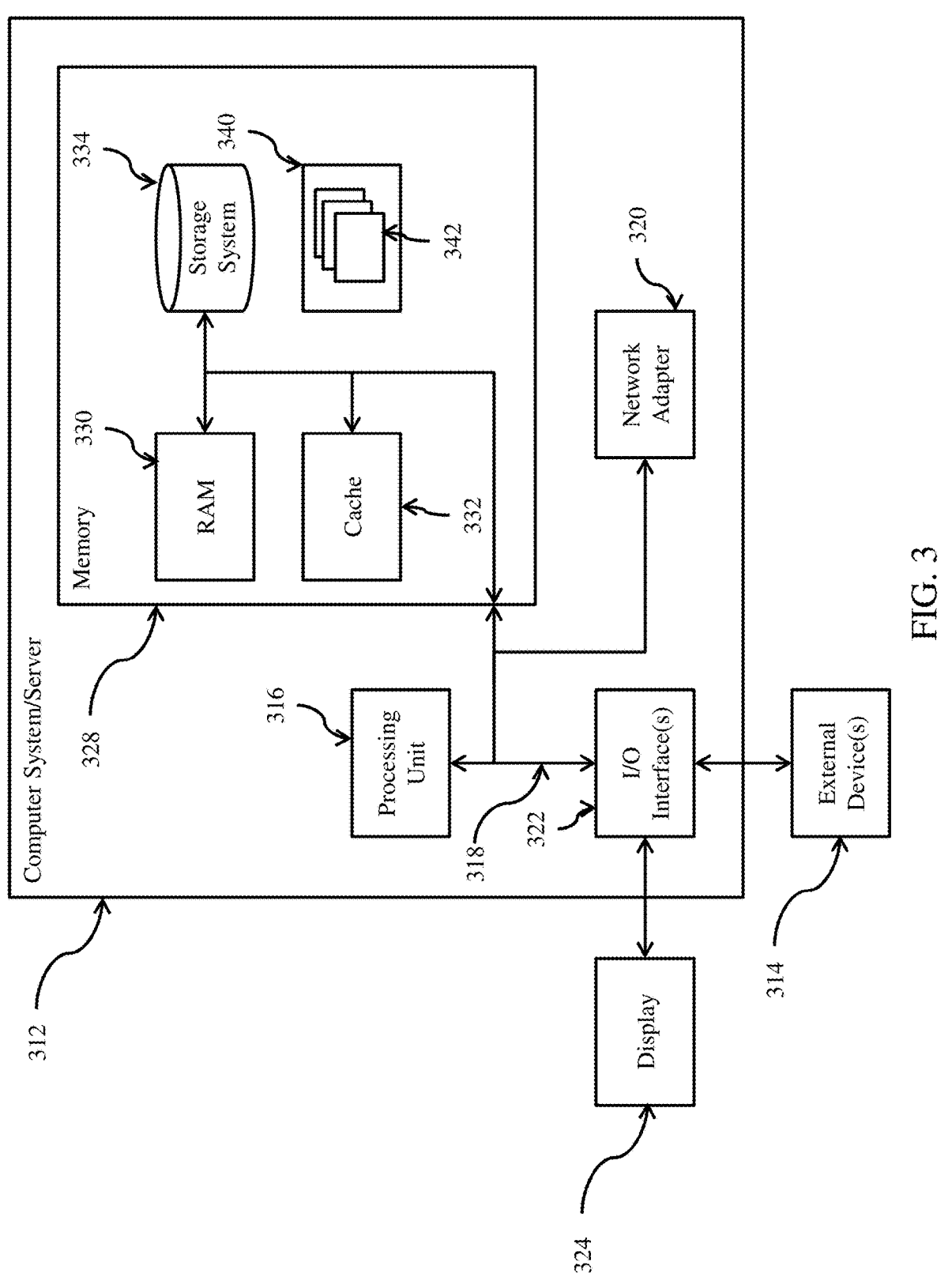
FIG. 3 is a schematic diagram of a computing node, in accordance with one or more embodiments of the present disclosure.

Referring now to FIG. 3, a schematic of an example of a computing node is shown. Computing node 310 is only one example of a suitable computing node and is not intended to suggest any limitation as to the scope of use or functionality of embodiments described herein. Regardless, computing node 310 is capable of being implemented and/or performing any of the functionality set forth hereinabove.

In computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the disclosure.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

It is understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
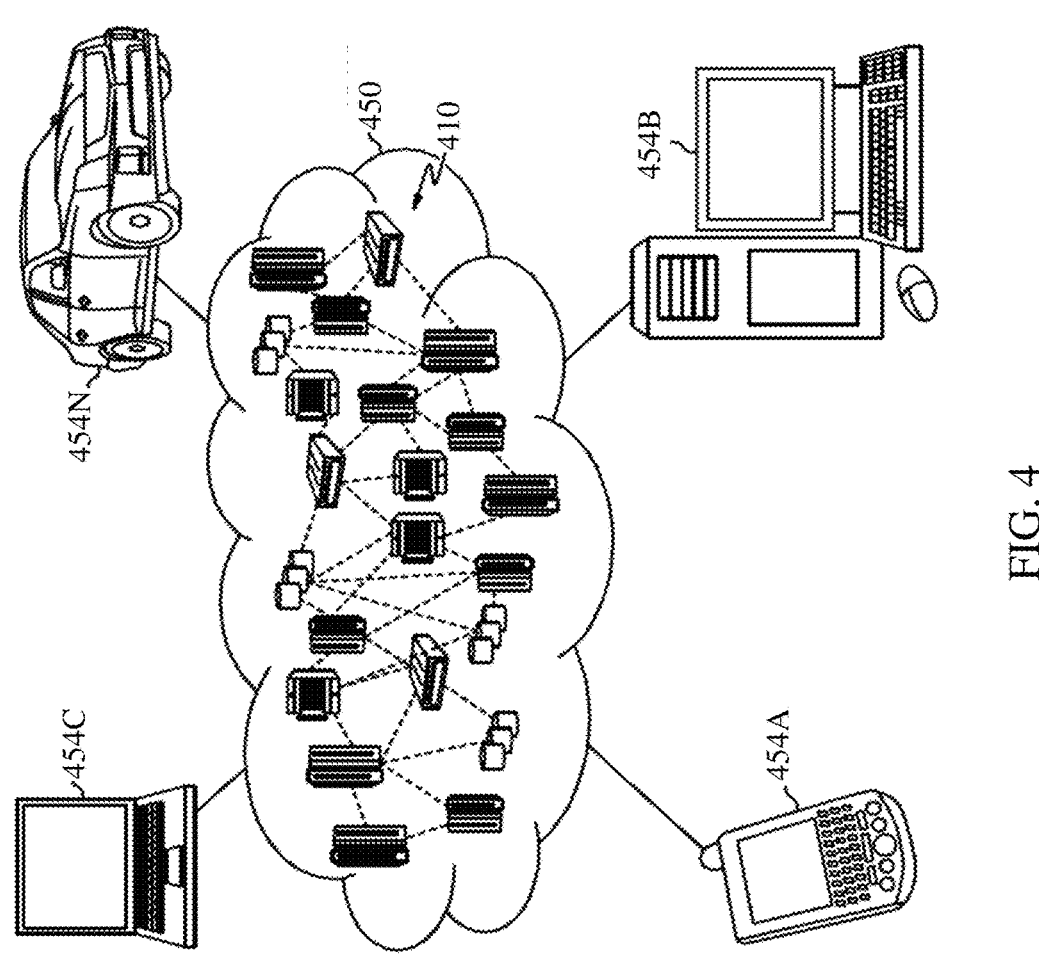
FIG. 4 is a schematic diagram of a cloud computing environment, in accordance with one or more embodiments of the present disclosure.

Referring now to FIG. 4, illustrative cloud computing environment 450 is depicted. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
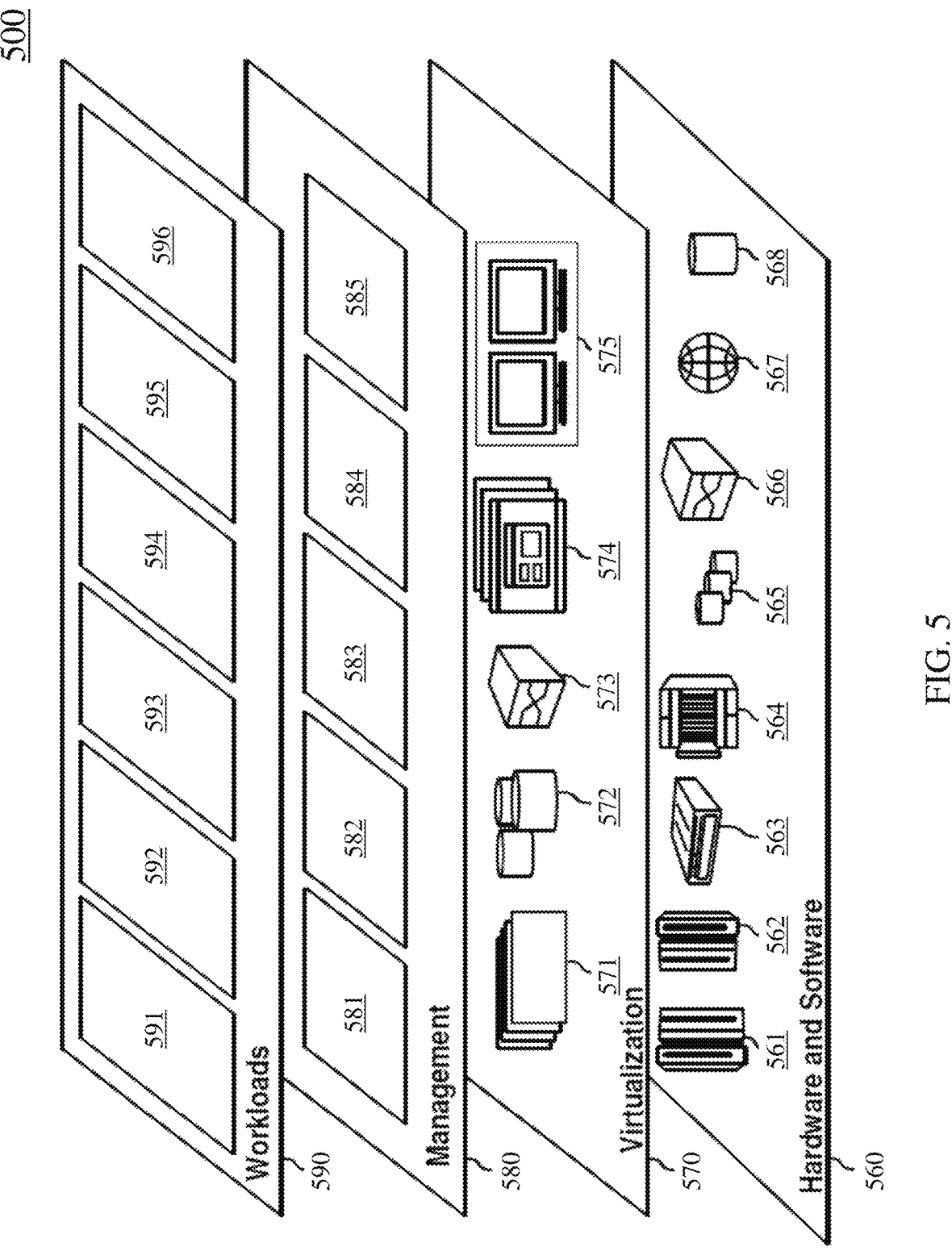
FIG. 5 is a block diagram depicting abstraction model layers, in accordance with one or more embodiments of the present disclosure.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include mainframes 561, in one example IBM® zSeries® systems; RISC (Reduced Instruction Set Computer) architecture based servers 562, in one example IBM pSeries® systems; servers 563, in one example IBM xSeries® systems; blade servers 564, in one example IBM BladeCenter® systems; storage devices 565; networks and networking components 566. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provides pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and sensitive information management 596.

The present disclosure may be embodied as a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference has been made in detail herein to the exemplary embodiments of the present disclosure, examples of which are illustrated in the accompanying drawings. The systems, devices, and methods disclosed herein are described in detail by way of examples, and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

For any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for limiting unauthorized access to sensitive information in a cloud workload, the method comprising:

receiving a provisioning request of a host server at a workload server associated with the cloud workload;

reading, by a secret manager of the cloud workload, the provisioning request, wherein the provisioning request comprises sensitive information and reading the provisioning request by the secret manager comprises intercepting the provisioning request upon receipt;

storing the sensitive information in memory accessible to the secret manager of the cloud workload;

provisioning resources on the workload server for an application instance based on the provisioning request;

reading, by the secret manager, an information request; and transmitting, to the application instance, the sensitive information.

2. The computer-implemented method of claim 1, wherein the sensitive information comprises an application programming interface key and/or a private key.

3. The computer-implemented method of claim 1, further comprising: encrypting the sensitive information.

4. The computer-implemented method of claim 3, wherein encrypting the sensitive information comprises randomly generating a key.

5. The computer-implemented method of claim 1, wherein the provisioning request comprises an identification of an origin of the provisioning request, wherein the computer-implemented method further comprises: determining the origin of the provisioning request is the host server based on the identification.

6. The computer-implemented method of claim 5, wherein the identification of the origin comprises a cryptographic signature, wherein determining whether the origin of the provisioning request is the host server comprises using a public key associated with the host server.

7. The computer-implemented method of claim 1, wherein the sensitive information is read by the secret manager at periodic time increments.

8. The computer-implemented method of claim 1, further comprising: removing the sensitive information from the memory responsive to transmitting the sensitive information to the host server.

9. The computer-implemented method of claim 1, wherein the cloud workload comprises a container executed in a pod.

10. The computer-implemented method of claim 1, wherein the sensitive information is only stored within the cloud workload in the memory.

11. A computer program product for limiting unauthorized access to sensitive information in a cloud workload, the computer program product comprising:

a set of one or more computer-readable storage media; and program instructions, collectively stored in the set of one or more computer-readable storage media for causing a processor set to perform the following computer operations:

receive a provisioning request of a host server at a workload server associated with the cloud workload;

read, by a secret manager of the cloud workload, the provisioning request, wherein the provisioning request comprises sensitive information and reading the provisioning request by the secret manager comprises intercepting the provisioning request upon receipt;

store the sensitive information in memory accessible to the secret manager of the cloud workload;

provision resources on the workload server for an application instance based on the provisioning request;

read, by the secret manager, an information request; and transmit, to the application instance, the sensitive information.

12. The computer program product of claim 11, wherein the program instructions further cause the processor set to encrypt the sensitive information, wherein encrypting the sensitive information comprises randomly generating a key.

13. The computer program product of claim 11, wherein the provisioning request comprises an identification of an origin of the provisioning request, wherein the computer-implemented method further comprises: determining the origin of the provisioning request is the host server based on the identification.

14. The computer program product of claim 11, further comprising:

removing the sensitive information from the memory responsive to transmitting the sensitive information to the host server.

15. The computer program product of claim 11, wherein the sensitive information is only stored within the cloud workload in the memory.

16. A computer system for limiting unauthorized access to sensitive information in a cloud workload, the computer system comprising:

a processor set;

a set of one or more computer-readable storage media; and program instructions, collectively stored in the set of one or more computer-readable storage media for causing the processor set to perform the following computer operations:

receive a provisioning request of a host server at a workload server associated with the cloud workload;

read, by a secret manager of the cloud workload, the provisioning request, wherein the provisioning request comprises sensitive information and reading the provisioning request by the secret manager comprises intercepting the provisioning request upon receipt;

store the sensitive information in memory accessible to the secret manager of the cloud workload;

provision resources on the workload server for an application instance based on the provisioning request;

read, by the secret manager, an information request; and transmit, to the application instance, the sensitive information.

17. The computer system of claim 16, wherein the provisioning request comprises an identification of an origin of the provisioning request, wherein the computer-implemented method further comprises: determining the origin of the provisioning request is the host server based on the identification.

18. The computer system of claim 16, further comprising: removing the sensitive information from the memory responsive to transmitting the sensitive information to the host server.

19. The computer system of claim 16, wherein the sensitive information is only stored within the cloud workload in the memory.

20. The computer system of claim 17, wherein the identification of the origin comprises a cryptographic signature, wherein determining whether the origin of the provisioning request is the host server comprises using a public key associated with the host server.

* * * * *